US008610703B2

(12) United States Patent
Kouno

(10) Patent No.: US 8,610,703 B2
(45) Date of Patent: Dec. 17, 2013

(54) LIQUID CRYSTAL DISPLAY DEVICE, AND DRIVING METHOD AND INTEGRATED CIRCUIT USED IN SAME

(75) Inventor: Makoto Kouno, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 947 days.

(21) Appl. No.: 12/687,643

(22) Filed: Jan. 14, 2010

(65) Prior Publication Data

US 2010/0182292 A1 Jul. 22, 2010

(30) Foreign Application Priority Data

Jan. 16, 2009 (JP) ................................ 2009-008045

(51) Int. Cl.
*G09G 5/00* (2006.01)
*G06F 3/038* (2013.01)

(52) U.S. Cl.
USPC ................................ 345/212; 345/92; 345/96

(58) Field of Classification Search
USPC ................................................. 345/205–212
See application file for complete search history.

(56) References Cited

U.S. PATENT DOCUMENTS

| | | | | |
|---|---|---|---|---|
| 7,079,125 | B2 * | 7/2006 | Nakagawa et al. | 345/209 |
| 7,098,885 | B2 * | 8/2006 | Kumada et al. | 345/96 |
| 7,362,300 | B2 * | 4/2008 | Hirama | 345/98 |
| 7,505,019 | B2 * | 3/2009 | Hirama | 345/98 |
| 7,573,470 | B2 * | 8/2009 | Hong | 345/204 |
| 7,663,619 | B2 * | 2/2010 | Morita | 345/212 |
| 7,742,021 | B2 * | 6/2010 | Shin | 345/76 |
| 7,859,505 | B2 * | 12/2010 | An | 345/99 |
| 2002/0050972 | A1 * | 5/2002 | Udo et al. | 345/96 |
| 2004/0041826 | A1 * | 3/2004 | Nakagawa et al. | 345/694 |
| 2004/0090434 | A1 * | 5/2004 | Miyazawa | 345/204 |
| 2005/0140600 | A1 * | 6/2005 | Kim et al. | 345/76 |
| 2005/0200575 | A1 * | 9/2005 | Kim et al. | 345/76 |
| 2006/0028408 | A1 * | 2/2006 | Kim | 345/76 |

(Continued)

FOREIGN PATENT DOCUMENTS

| | | |
|---|---|---|
| CN | 1577013 A | 2/2005 |
| CN | 1854836 A | 11/2006 |

(Continued)

OTHER PUBLICATIONS

Office Action issued by Japanese Patent Office in Japanese Application No. 2009-008045 dated Dec. 4, 2012.

(Continued)

*Primary Examiner* — Amare Mengistu
*Assistant Examiner* — Sarvesh J Nadkarni
(74) *Attorney, Agent, or Firm* — Sughrue Mion, PLLC

(57) ABSTRACT

A liquid crystal display device is provided which is capable of realizing high-quality display screen with low power consumption. A charge equilibration control signal VCST is outputted by a control unit (for example, driving timing generating section) for charge equilibration time in accordance with a video signal. At time of change in polarities of common voltages vCOM1 and vCOM2, a charge equilibration unit causes a shorting of a circuit between common electrodes COM1 and COM2 in accordance with the charge equilibration control signal so that a charge equilibration occurs between the common electrodes COM1 and COM2. The switching section turns off common voltages vCOM1 and vCOM respectively to the common electrodes COM1 and COM2. According to the charge equilibration control signal, the connection is turned on between the common electrodes COM1 and COM2.

5 Claims, 10 Drawing Sheets

(56) References Cited

U.S. PATENT DOCUMENTS

| | | | | |
|---|---|---|---|---|
| 2006/0066532 | A1* | 3/2006 | Jeong | 345/76 |
| 2006/0077138 | A1* | 4/2006 | Kim | 345/76 |
| 2006/0108937 | A1* | 5/2006 | Kim | 315/169.3 |
| 2006/0158412 | A1* | 7/2006 | Morita | 345/94 |
| 2006/0158413 | A1* | 7/2006 | Morita | 345/94 |

FOREIGN PATENT DOCUMENTS

| | | | |
|---|---|---|---|
| CN | 1897298 | A | 9/2007 |
| JP | 63-296092 | A | 12/1988 |
| JP | 05-188881 | A | 7/1993 |
| JP | 06-149174 | A | 5/1994 |
| JP | 11-030975 | A | 2/1999 |
| JP | 2000-221473 | A | 8/2000 |
| JP | 2004-212748 | A | 7/2004 |

OTHER PUBLICATIONS

Office Action issued by the Chinese Patent Office in Chinese Application No. 201010003503.6 dated Aug. 23, 2012.

* cited by examiner

LIQUID CRYSTAL DISPLAY DEVICE, AND DRIVING METHOD AND INTEGRATED CIRCUIT USED IN SAME

INCORPORATION BY REFERENCES

This application is based upon and claims the benefit of priority from Japanese Patent Application No. 2009-008045, filed on Jan. 16, 2009, the disclosure of which is incorporated herein in its entirely by reference.

BACKGROUND OF THE INVENTION

1. Field of the Invention

The present invention relates to a liquid crystal display device, a driving method and an integrated circuit to be used in the same, and more particularly to the liquid crystal display device, the driving method and the integrated circuit to be suitably used when a high-quality display screen is realized with low power consumption.

2. Description of the Related Art

In recent years, as one of measures against global warming, lowed power consumption in electrical goods is required. Therefore, in a field of image display devices in particular, a liquid crystal display device has become widely used owing to its greater possibility of low power consumption and space saving compared with a conventional CRT (Cathode Ray Tube).

As a related technology of this kind, a liquid crystal display device is disclosed in, for example, Japanese Laid-open Patent Application No. Sho63-296092 (Pages. 1-2, FIGS. 1 and 2) (hereinafter, referred to as Patent Reference 1) and Japanese Laid-open Patent Application No. Hei06-149174 (Abstract, FIGS. 1 and 2) (hereinafter, referred to as Patent Reference 2).

The disclosed liquid crystal display device, as shown in FIG. 5, includes a liquid crystal panel 1, a data driving section 2, a gate driving section 3, a VCOM generating section 4, and a driving timing generating section 5. The disclosed liquid crystal panel 1 is made up of data electrodes Xi (i=1, 2, . . . , m; for example, m=1920), gate electrodes Yj (j=1, 2, . . . , n; for example, n=1080), pixels SPi,j, common electrodes COM1 and COM2. The common electrode COM 1 is a facing electrode of each of the pixels SPi,j mounted in a manner to correspond to odd-numbered columns of the data electrodes Xi. The common electrode COM2 is a facing electrode of each of the pixels SPi,j in a manner to correspond to each even-numbered column of the data electrodes Xi. Each of the pixel SPi,j is mounted at an intersection of each of the data electrodes Xi and each of the gate electrodes Yj and is made up of a TFT (Thin Film Transistor) Q and a capacitor C. The capacitor C schematically shows a holding capacitor to hold a voltage corresponding to applied pixel data Di (D1, D2, . . . , Dm) and a liquid crystal layer displaying a pixel with a gray level corresponding to the pixel data Di.

The driving timing generating section 5 sends out, at timing based on a video signal vi and according to a specified AC (Alternating Current) driving method (for example, to a data line inversion driving) a control signal ct1 to the data driving section 2, a control signal ct2 to the gate driving section 3, and a control signal ct3 to the VCOM generating section 4. The data driving section 2 applies, in accordance with the control signal ct1, a voltage corresponding to pixel data Di through each data electrode Xi to each of the pixels SPi,j of the liquid crystal panel 1. The gate driving section 3 applies a scanning signal Gj (G1, G2, . . . , Gn) in a preset order in accordance with a control signal ct2. The VCOM generating section 4, in accordance with a control signal ct3, applies common voltages vCOM 1 and vCOM 2 being opposite to each other in polarity for every frame period. In the liquid crystal display device, as shown in FIG. 6, data line inversion driving is performed by the application of the common voltages vCOM1 and vCOM2 being opposite to each other in polarity for every frame period to the common electrodes COM1 and COM2.

The liquid crystal display device disclosed in Japanese Laid-open Patent Application No. Hei05-188881 (Abstract, FIGS. 1 and 4) (hereinafter, referred to as Patent Reference 3), as shown in FIG. 7, includes a display section 10, a power circuit 21, a control section 22, a common electrode driver 23, and a switching section 24. The display section 10 has a liquid crystal panel 11, a data driving section 12, and a gate driving section 13. The liquid crystal panel 11 has a plurality of common electrodes. The common electrode driver 23, in accordance with an alternating current control signal b, drives the common electrodes of the liquid crystal panel 11 through a driving line. The power circuit 21 supplies power current to the common electrode driver 23. The switching section 24 has switches S1, Sn and, in accordance with a switch control signal d, connects and disconnects a driving line used to connect the common electrode driver 23 with the common electrode of the liquid crystal panel 11 with and from the power circuit 21 and turns on/off a common electrode signal c (c1) and sends out, as a feedback signal e (e1) to the power circuit 21. The control section 22, based on an alternated control signal a, outputs the alternating current control signal b and the switch control signal d and performs gate line inversion driving on the display section 10.

In the disclosed liquid crystal display device, when the above driving line is periodically switched by the common electrode driver 23 between two different potentials, the common electrode is driven and the driving line is connected by the control section 22 through the switching section 24 to the power circuit 21 for a specified period of time following the timing at which each driving line is switched from a high potential state to a low potential state and, as shown in FIG. 8, a common electrode signal c (ci) being part of the driving current is fed back as a feed-back signal e (ei) to the power circuit 21.

Additionally, the liquid crystal display device disclosed in Japanese Laid-open Patent Application No. Hei11-030975 (Abstract, FIG. 1) (hereinafter, referred to as Patent Reference 4) includes a liquid crystal panel 31, a data driving section 32, and a gate driving section 33.

The disclosed liquid crystal display device 31, as in the case of the liquid crystal display device 1 in FIG. 5, has data electrodes Xi, gate electrodes Yj, pixels SPi,j, however, has a common electrode COM only as the facing electrode. The data driving section 32 applies a voltage corresponding to pixel data Di through each data electrode Xi to every pixel SPi, j on the liquid crystal panel 31. Moreover, the data driving section 32 has switches SWC1, SWC2, . . . , SWCm to disconnect outputs from the data electrode Xi, X2, . . . , Xm and switches SWD1, SWD2, . . . , SWDm-1 to cause a short between the data electrodes Xi adjacent to each other. The gate driving section 33 applies a scanning signal Gj to each scanning line Y1 in preset orders.

In the disclosed liquid crystal display device, the switches SWC1, SWC2, . . . , SWCm are put into an ON state at a specified timing and the switches SWD1, SWD2, . . . , SWDm-1 are put into an OFF state at a specified timing and, therefore, as shown in FIG. 10, during a charge equilibration period f, the data electrode X1, . . . , Xm are charged and discharged to a specified level whereby the electric charge equilibration occurs and, as a result, power consumption to drive the liquid crystal panel 31 is reduced.

However, the disclosed liquid crystal display device has the following problems. That is, in the liquid crystal display device disclosed in the related art Patent Reference 1 and 2, the data line inversion driving is performed and, therefore, the power consumption is lower compared with the case of the dot inversion driving, however, flicker readily occurs, thus causing the deterioration of display quality.

The liquid crystal display device disclosed in the related art Patent Reference 3 has also a problem in that, though outputs of the common electrode driver 23 is kept to be connected to the driving line, since output impedance of the common electrode driver 23 is low and impedance of the power circuit 21 is high and, as a result, even by returning a feed back signal e (ei) back to the power circuit 21, no charge collection occurs at all. Moreover, since the gate line inversion driving is performed on the display section 10, display quality is lowered due to the occurrence of flicker.

In the liquid crystal display device disclosed in the related art Patent References 1, 2, and 3, by the sacrifice of display quality, low power consumption is to be achieved, the trade-off between high display quality and low power consumption, that is, the trade-off between the dot inversion driving to provide high display quality and the line inversion driving to provide low display quality, has not yet been overcome. To try to overcome the trade-off, by decreasing the number of times of discharge of capacitive load of the liquid crystal panel, the low power consumption is to be achieved, however, the problem still remains unsolved that display quality is lowered due to the occurrence of flicker and high display quality is incompatible with the low power consumption.

In addition, in the liquid crystal display device disclosed in the related art Patent Reference 4, since the supply voltage itself for driving of the liquid crystal panel 31 has not decreased, in the circuit of the data driving section 32, power to be consumed at the place where the supply power is being applied remains high. Therefore, the problem still remains unsolved in terms of low power consumption.

SUMMARY OF THE INVENTION

In view of the above, it is an object of the present invention to provide a liquid crystal display device, a driving method and integrated circuits to be used in the same which can achieve a high-quality display screen with low power consumption.

According to a first aspect of the present invention, there is provided a liquid crystal display device including:

a liquid crystal panel having specified number of columns of data electrodes, specified number of rows of gate electrodes, pixels each mounted at an intersection of each of the data electrodes and each of the gate electrodes, a first common electrode operating as a facing electrode of each of the pixels mounted so as to correspond to odd-numbered columns of the data electrodes and a second common electrode operating as a facing electrode of each of the pixels mounted so as to correspond to even-numbered columns of the data electrodes;

a data driving section to write pixel data corresponding to each of the data electrodes in accordance with a video signal;

a gate driving section to drive each of the gate electrodes in a specified order in accordance with the video signal;

a common voltage generating section to generate a first common voltage whose polarity is inverted for every one horizontal period and to be applied to the first common electrode and to generate a second voltage having a polarity opposite to that of the first common voltage to be applied to the second common electrode in accordance with the video signal; and a control unit to exert control on the data driving section, the gate driving section, and the common voltage generating section in accordance with a video signal, and;

wherein a charge equilibration unit is provided to establish a charge equilibration between the first common electrode and the second common electrode in accordance with a charge equilibration control signal at a time of change in polarities of the first common voltage and the second common voltage and wherein the control unit outputs the charge equilibration control signal in accordance with the video signal.

According to a second aspect of the present invention, there is provided a driving method to be used in a liquid crystal display device having a liquid crystal panel having specified number of columns of data electrodes, specified number of rows of gate electrodes, pixels each mounted at an intersection of each of the data electrodes and each of the gate electrodes, a first common electrode operating as a facing electrode of each of the pixels mounted so as to correspond to odd-numbered columns of the data electrodes and a second common electrode operating as a facing electrode of each of the pixels mounted so as to correspond to even-numbered columns of the data electrodes, a data driving section to write pixel data corresponding to each of the data electrodes in accordance with a video signal, a gate driving section to drive each of the gate electrodes in a specified order in accordance with the video signal, a common voltage generating section to generate a first common voltage whose polarity is inverted for every one horizontal period and to be applied to the first common electrode and to generate a second voltage having a polarity opposite to polarity of the first common voltage to be applied to the second common electrode in accordance with the video signal, and a control unit to exert control on the data driving section, gate driving section, and the common voltage generating section in accordance with a control signal, and; wherein a charge equilibration unit establishes a charge equilibration between the first common electrode and the second common electrode in accordance with a charge equilibration control signal at a time of change in polarities of the first common voltage and the second common voltage and the control unit and the control unit outputs the charge equilibration control signal in accordance with the video signal.

With the above configurations, it is made possible to realize the high-quality display screen with low power consumption.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various exemplary embodiments with reference to the accompanying drawings. A liquid crystal display device of the exemplary embodiment has a charge equilibration unit made up of a switching section to cause a shorting of a circuit between a first common electrode and a second common electrode according to a charge equilibration control signal at a change point of polarities of a first common voltage and a second common voltage and a control unit outputs the charge equilibration control signal at the change point of polarities of the first and second common voltages for a specified period of time required to establish a charge equilibration between the first and second common voltages.

In the liquid crystal display device of the preferred embodiment of the present invention, the switching section has a first switch to put the application of a first common voltage to the first common electrode into an ON state according to the charge equilibration control signal, a second switch to put the application of a second common voltage to the second common electrode according to the charge equilibration control signal into an OFF state, and a third switch to put the first common electrode and second common electrode into an OFF state.

Also, according to the preferred embodiment, the above switching section is made up of one integrated circuit (IC) chip.

Moreover, according to the preferred embodiment, at least one of a data driving section, gate driving section, common voltage generating section, control unit, and switching section is configured to be integrally contained in one integrated circuit chip.

Exemplary Embodiment

Figure 1:
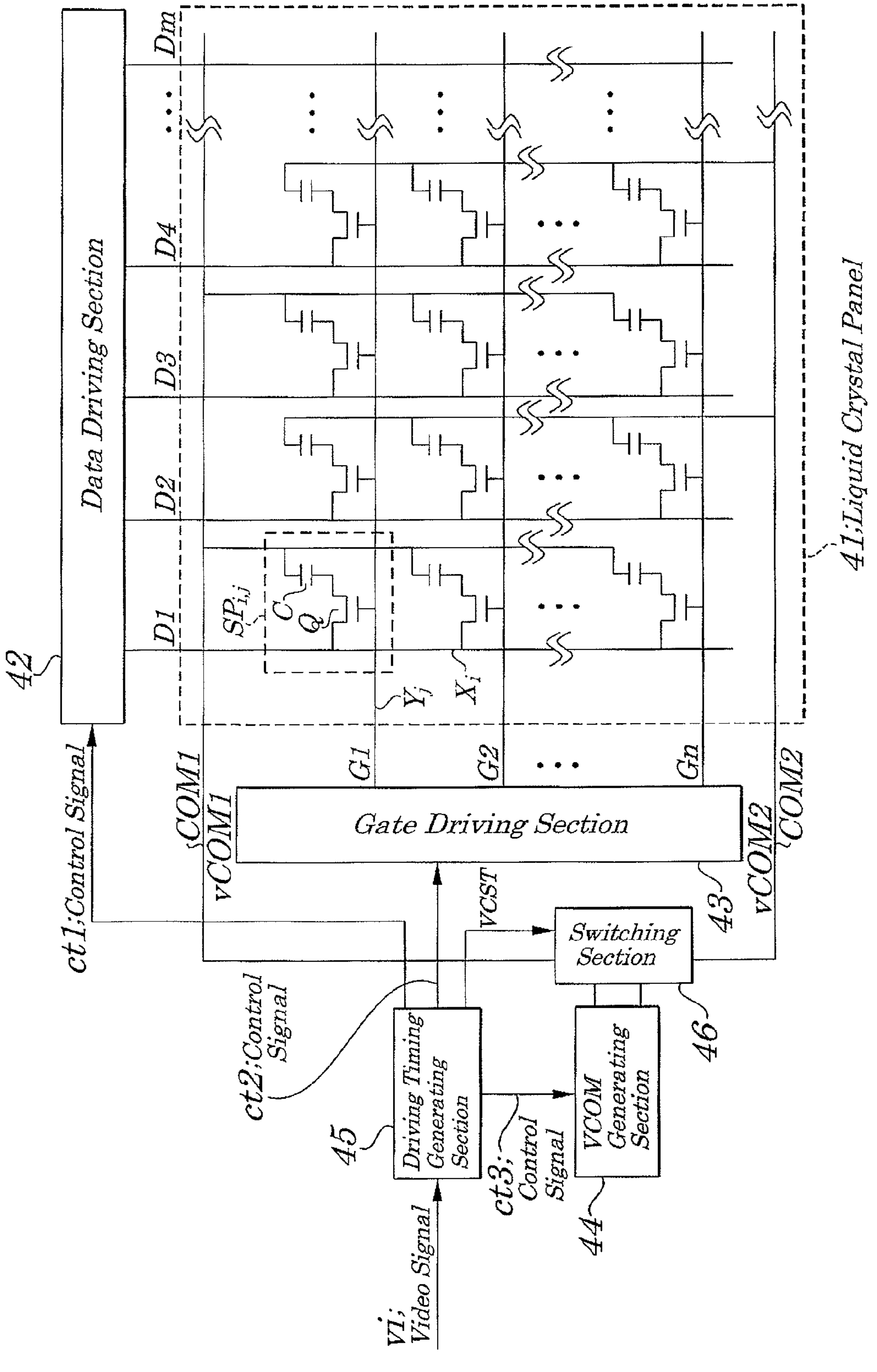
FIG. 1 is a schematic block diagram showing electrical configurations of main components of a liquid crystal display device according to an exemplary embodiment of the present invention.

FIG. 1 is a block diagram showing electrical configurations of main components of the liquid crystal display device according to an exemplary embodiment of the present invention.

The liquid crystal display device of the exemplary embodiment, as shown in FIG. 1, includes a liquid crystal panel 41, a data driving section 42, a gate driving section 43, a VCOM generating section, a driving timing generating section 45, and a switching section. The liquid crystal panel 41 is made up of data electrodes Xi (i=1, 2, . . . , m, for example, m=1920), gate electrodes Yj (j=1, 2, . . . , n, for example, n=1080), pixels SPi,j, and common electrodes COM1 and COM2. The common electrode COM1 is a facing electrode of each of the pixels SPi,j mounted in a manner to correspond to odd-numbered columns of the data electrodes Xi. Each of the pixels Pi,j is mounted at an intersection of each of the data electrodes Xi and each of the gate electrodes Yj and is made up of a TFT (Thin Film Transistor) Q and a capacitor C. The capacitor C schematically shows a holding capacitor to hold a voltage corresponding to applied pixel data Di and a liquid crystal layer displaying a pixel with a gray level corresponding to the pixel data Di.

The driving timing generating section 45 sends out, at timing based on an inputted video signal vi and according to a specified alternating driving method (for example, dot inversion driving), a control signal ct1 to the data driving section 42 and a control signal ct2 to the gate driving section 43, and a control signal ct3 to the VCOM generating section 44. The data driving section 42 applies, in accordance with the control signal ct1, a voltage corresponding to the pixel data Di through each data electrode Xi to each of the pixels SPi,j of the liquid crystal panel 41. The gate driving section 43 applies a scanning signal Gj to each of the scanning electrode Yj in accordance with the control signal ct2 in a preset order. The VCOM generating section 44 generates a common voltage vCOM1 to apply a voltage whose voltage is inverted in accordance with the control signal ct3 for every horizontal period to the common electrode COM1 and a common voltage vCOM2 to apply a voltage having a polarity opposite to that of the common voltage vCOM1 to the common electrode COM2. Also, the driving timing generating section 45 outputs a charge equilibration control signal VCST based on a video signal vi in particular according to the exemplary embodiment. The switching section 46, when the polarities of the common voltages vCOM1 and vCOM2 change, establishes a charge equilibration between the common electrodes COM1 and COM2 in accordance with the charge equilibration control signal VCST.

In this situation, the common electrodes COM1 and COM2 are short-circuited by the switching section 46 according to a charge equilibration control signal VCST at a change point of polarities of the common voltages vCOM1 and vCOM2. Also, the driving timing generating section 45 outputs specified time (called "charge equilibration time") required to cause a shorting of a circuit between the common electrode COM1 and COM2 at the change point of the polarities of the common voltage vCOM1 and vCOM2.

Figure 2:
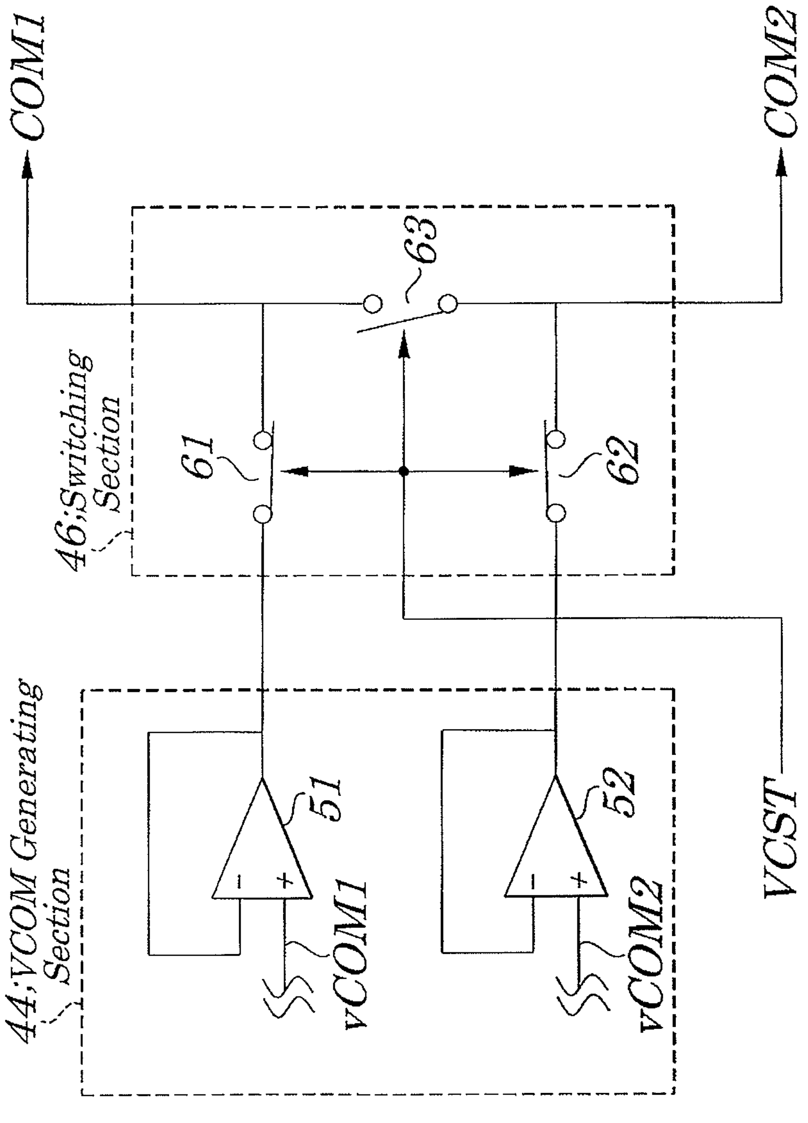
FIG. 2 is a circuit diagram illustrating electrical configurations of main components of a VCOM generating section and switching section of FIG. 1.

FIG. 2 is a circuit diagram illustrating electrical configurations of main components of the VCOM generating section and switching section of FIG. 1.

The VCOM generating section **44*b* has output amplifiers 51 and 52 as shown in FIG. 2. The output amplifier 51 receives a common voltage vCOM1 with high input impedance and outputs the same with low output impedance. The output amplifier 52 receives a common voltage vCOM2 with high input impedance and outputs the same with low output impedance. The switching section 46 has a switch 61, a switch 62, and a switch 63. The switch 61 puts, according to a charge equilibration control signal VCST, the application of the common voltage vCOM1 to the common electrode COM1 into an OFF state. The switch 62 puts, according to the charge equilibration control signal VCST, the application of the common voltage vCOM2 to the common electrode COM2 into an OFF state. The switch 3, according to the charge equilibration control signal VCST, puts the application of a voltage between the common electrodes COM1 and COM2 into an ON state. The switching section 46** is made up of one integrated circuit chip.

Figure 3:
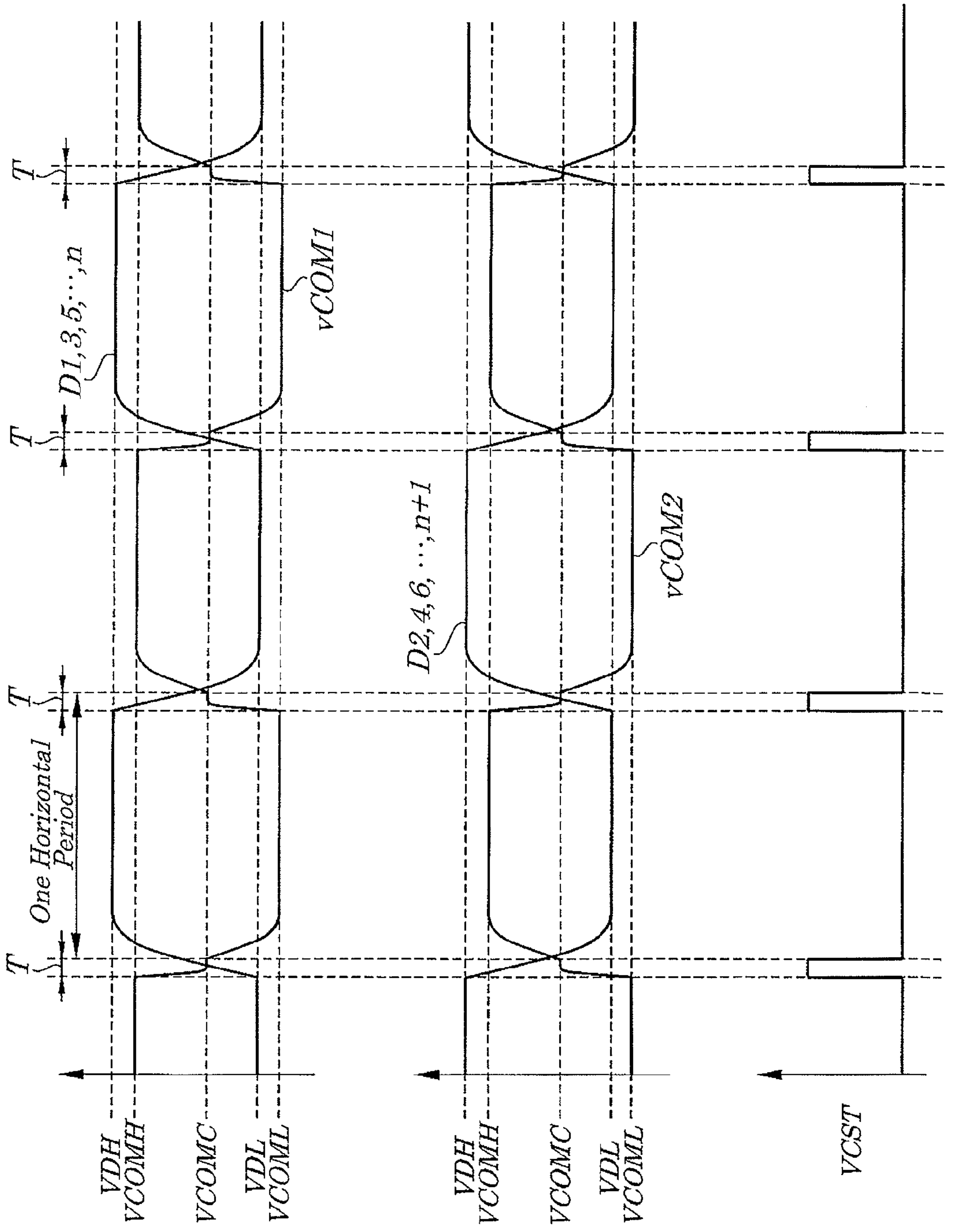
FIG. 3 is a waveform diagram explaining operations of the liquid crystal display device of FIG. 1.

FIG. 3 is a waveform diagram explaining operations of the liquid crystal display device of FIG. 1. By referring to FIG. 3, processing contents of a driving method to be used in the liquid crystal display device of FIG. 1 are described below.

In the liquid crystal display device, a charge equilibration control signal VCST is outputted according to a video signal vi by the driving timing generating section 45 and, when polarities of the common voltage vCOM1 and the common voltage vCOM2 change, the common electrode COM1 and common electrode COM2 are short-circuited by the switching section 46 according to the charge equilibration control signal VCST and, as a result, a charge equilibration is established between the common electrode COM1 and common electrode COM2. In this situation, the switch 61 of the switching section 46 puts the application of the common voltage vCOM1 to the common electrode COM1 into an OFF state in accordance with the charge equilibration control signal VCST and the switch 62 puts the application of the common voltage vCOM2 to the common electrode COM2 into an OFF state. The common electrodes COM1 and COM2 are put into an ON state by the switch 63 according to the charge equilibration control signal VCST.

That is, a common voltage vCOM1 to be applied to the common electrode COM1 and a common voltage vCOM2 to be applied to the common electrode COM2 are generated by the VCOM generating section 44. In this case, as shown in FIG. 3, the common voltage vCOM1 is outputted as a high potential voltage VCOMH from the output amplifier 51 and the common voltage vCOM2 is outputted as a low potential voltage VCOML from the output amplifier 52 and, during one horizontal period, the voltages VCOML and VCOMH are outputted alternately. The common voltage vCOM1 and common voltage vCOM2 are outputted so as to be opposite to each other. The voltage of pixel data Di outputted from the data driving section 42 is outputted in a range between the voltages VDL and VDH.

In the switching section 46, the switch 61 is put into an OFF state when a charge equilibration control signal VCST is at a high level and the switch 62 is put into an ON state when the charge equilibration control signal VCST is at a low level. On the contrary, the switch 63 is put into an ON state when the charge equilibration control signal VCST is at a high level and into an OFF state when the charge equilibration control signal VCST is at a low level. By operations of the switches 61, 62, and 63, at a change point of polarities of the common voltage vCOM1 and vCOM2, by making the charge equilibration control signal VCST be at a higher level only for the charge equilibration time T, the common electrodes COM1 and COM2 are in a state being separated from the output amplifiers 51 and 52. Since the switch 63 is only in the ON state, a shorting of a circuit occurs between the common electrodes COM1 and COM2.

At this point of time, since the common voltage vCOM1 is opposite in polarity to the common voltage vCOM2, a shorting of a circuit occurs between the common electrode COM1 and common electrode COM2 and, as a result, the common voltage becomes a voltage VCOMC being at an intermediate potential between the voltages VCOMH and VCOML. After the occurrence of the charge equilibration between the common voltages vCOM1 and VCOMC, the charge equilibration control signal VCST becomes at a low potential level, which causes the switch 63 to be in an OFF state and the switches 61 and 62 to be in an ON state and, as a result, the voltages VCOMH and VCOML each having a polarity are outputted to the common electrodes COM1 and COM2. At this time, a shift occurs from the voltage VCOMC being at an intermediate potential, the common electrodes can be charged by using half the power compared with the case of the shift from the voltages VCOMH and VCOML. By performing the driving as above, dot inversion driving with less occurrence of flicker and with good display quality can be realized, whereby low power consumption can be achieved.

Here, a comparison is made of power consumption achieved by the dot inversion driving with less flicker and with good quality display between the liquid crystal display device of the exemplary embodiment and the liquid crystal display device disclosed in the related art Patent Reference 4.

charging power of a capacitive load when seen from power source is expressed by the following equation (1):

$$P=C\times V^2\times f \tag{1}$$

where P denotes power supplied from a power source, C denotes electrostatic capacity, V denotes a voltage to be applied to C, and f denotes a driving frequency.

Power P required for the dot inversion driving without performing the charge equilibration operation is calculated by the equation (1) and, therefore, the power is expressed by the following equation (2):

$$P=Cd\times Vd^2\times fH \tag{2}$$

where Cd denotes electrostatic capacity from data electrode X1 to Xm, Vd denotes a voltage applied for data electrode, and fH denotes a frequency for one horizontal period:

Moreover, power required for the dot inversion driving employed in the exemplary embodiment is calculated and, as a result, the voltage to be applied to the data electrode decreases by ½ and the voltage to be applied to the common electrode COM1 and common electrode COM2, owing to the charge equilibration operation, decreases by ½ and, therefore, the power P is expressed by the following equation (3).

$$\begin{aligned} P &= Cd\times(Vd/2)^2\times fH + Cc\times(Vd/2/2)^2\times fH \\ &= 1/4\times Cd\times Vd^2\times fH + 1/16\times Cc\times Vd^2\times fH \end{aligned} \tag{3}$$

where Cc denotes electrostatic capacitance of the common electrode COM1 and common electrode COM2. Here, if it is assumed that Cc=Cd, the power P is calculated by the equation (3) and is expressed by the following equation (4):

$$P=5/16\times Cd\times Vd^2\times fH \tag{4}$$

It can be understood from the above equations (2) and (4) that the power consumption required to drive the liquid crystal panel 41 in the dot inversion driving way by performing the charge equilibration operation decreases by about 30% compared with the case of the power consumption required to drive the same in the dot inversion driving way by performing no charge equilibration operation.

When power P required to drive the liquid crystal panel in the dot inversion driving way by performing the charge equilibration by causing a shorting of a circuit between data electrodes as shown in the related art Patent Reference 4 is calculated, stripe display for every second line in the direction of data electrodes X1, . . . , Xm becomes a worst display, two cases occur, one is where applied voltage to the data electrode decreases by ¾ and another is where applied voltage to the data electrode decreases by ¼ and, therefore, the power P is expressed by the following equation (5):

$$\begin{aligned} P &= \{(Cd\times(3/4\times Vd)^2\times fH) + (Cd\times(1/4\times Vd)^2\times fH)\}/2 \\ &= 5/16\times Cd\times Vd^2\times fH \end{aligned} \tag{5}$$

Figure 10:
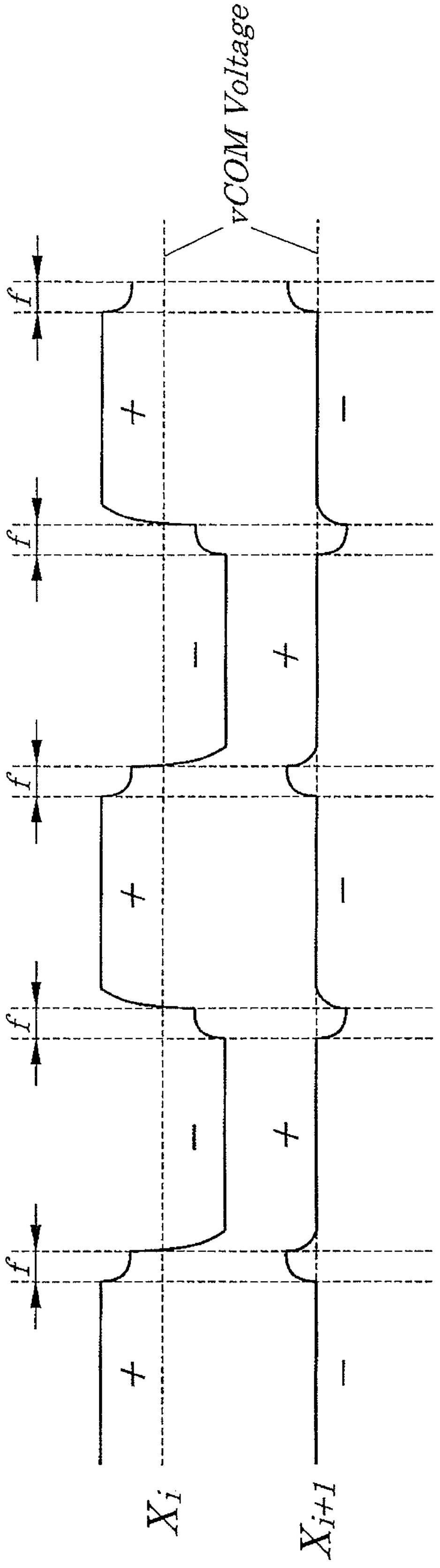
FIG.10(RELATED ART)
FIG. 10 is a waveform diagram explaining operations of the related art liquid crystal display device of FIG. 9.

As shown in the equation (5), the power consumption required to drive the liquid crystal panel 31 in FIG. 10 is the same as in the case of driving the liquid crystal panel 41 in the dot inversion driving employed in the exemplary embodiment, however, if the technology disclosed in the related art Patent Reference 4 is used, supply voltage required for driving the liquid crystal panel is higher about twice than the supply voltage required in the exemplary embodiment and, therefore, the power consumed at the place where the supply power is used for driving the liquid crystal panel in the circuit making up the data driving section 32 in the related art Patent Reference 4 becomes larger twice than the power consumed at the place where the supply power is used for driving the liquid crystal panel in the circuit making up the data driving section 42 employed in the exemplary embodiment. Thus, from the view point of low power consumption in the liquid crystal display device, the technology disclosed in the related art Patent Reference 4 is not sufficient.

Additionally, when power P is calculated in the case where the technology of the exemplary embodiment is applied to the driving of the liquid crystal panel in the dot inversion driving by performing the charge equilibration by causing a shorting of a circuit between the data driving sections as shown in the related art Patent Reference 4, since the voltage applied to the data electrode decreases by ½, the power P is expressed by the following equation (6):

$$P = \{(Cd \times (3/4/2 \times Vd)^2 \times fH) + (Cd \times (1/4/2 \times Vd)^2 \times fH)\}/2 + Cc \times (Vd/2/2)^2 \times fH = (5/32) \times Cd \times Vd^2 \times fH + (1/16) \times Cc \times Vd^2 \times fH \quad (6)$$

Here, if it is assumed that Cc=Cd, by the equation, the power P is expressed by the equation (7).

$$P = 7/32 \times Cd \times Vd^2 \times fH \quad (7)$$

It can be understood from the above equations (5) and (7) that the power consumption required to drive the liquid crystal panel 41 in the dot inversion driving by performing the charge equilibration operation of the exemplary embodiment decreases by further 30% compared with the case of the power consumption required to drive the same in the way described in the related art Patent Reference 4.

It is assumed in the low power consumption technology disclosed in the related art Patent References 1 to 3 that display quality decreases when the data line inversion driving or the gate line inversion driving in which flicker readily occurs is applied. Thus, by applying the exemplary embodiment of the present invention, for the application where both high image quality and low power consumption are required, the trade-off between high display quality and low power consumption can be overcome.

Thus, according to the exemplary embodiment of the present invention, the charge equilibration control signal VCST is outputted in accordance with a video signal vi for charge equilibration period of time and when the polarities of the common voltages vCOM1 and vCOM2 change, the common electrodes COM1 and COM2 are short-circuited by the switching section 46 according to the charge equilibration control signal VCST, as a result, a charge equilibration occurs between the common electrodes COM1 and COM2, which enables high quality display screen with low power consumption.

While the invention has been particularly shown and described with reference to exemplary embodiments thereof, the invention is not limited to these exemplary embodiments. For example, in the above exemplary embodiment, the switching section 46 in FIG. 1 is constructed as a one integrated circuit chip, however, part or all of the data driving section 42, the gate driving section 43, the VCOM generating section 44, the driving timing generating section 45 and the switching section 46 may be included in a one integrated circuit chip.

Figure 4:
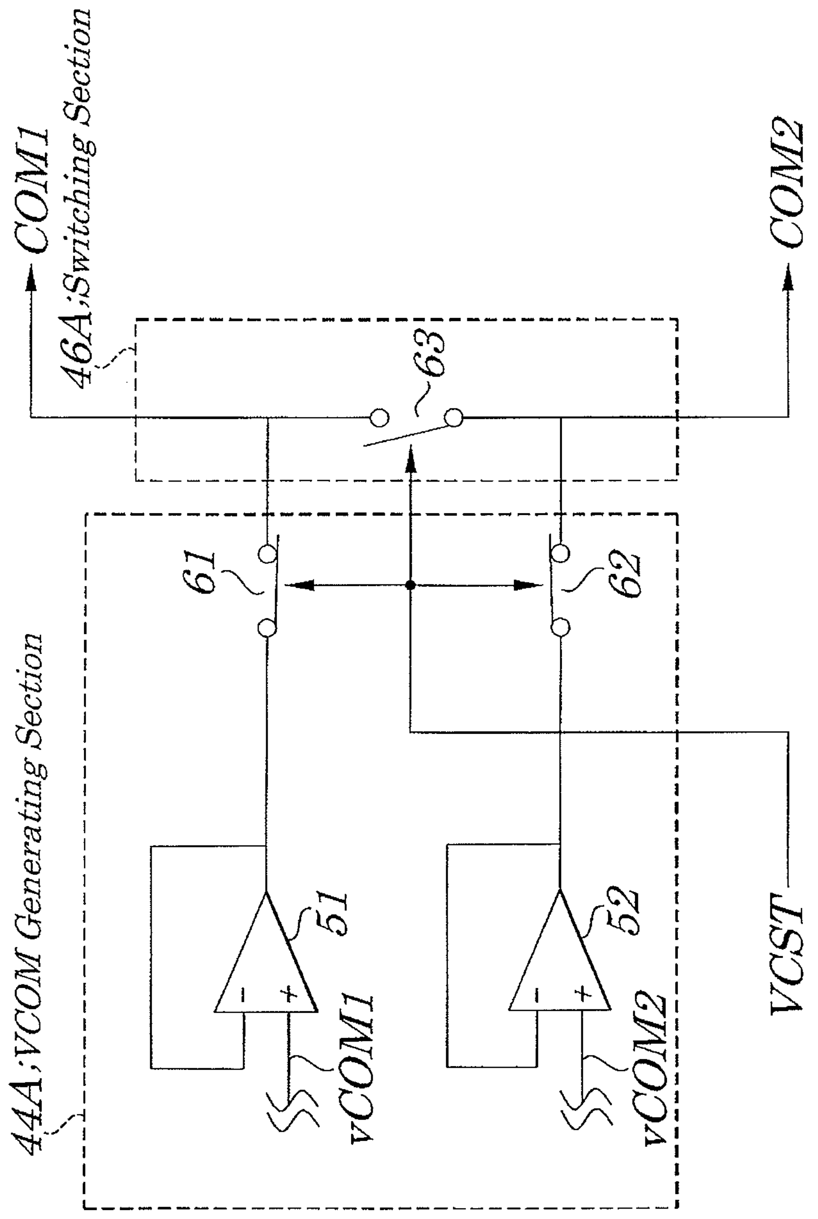
FIG. 4 is a configuration diagram illustrating a modified example of a VCOM generating section and a switching section of FIG. 1.
Figure 5:
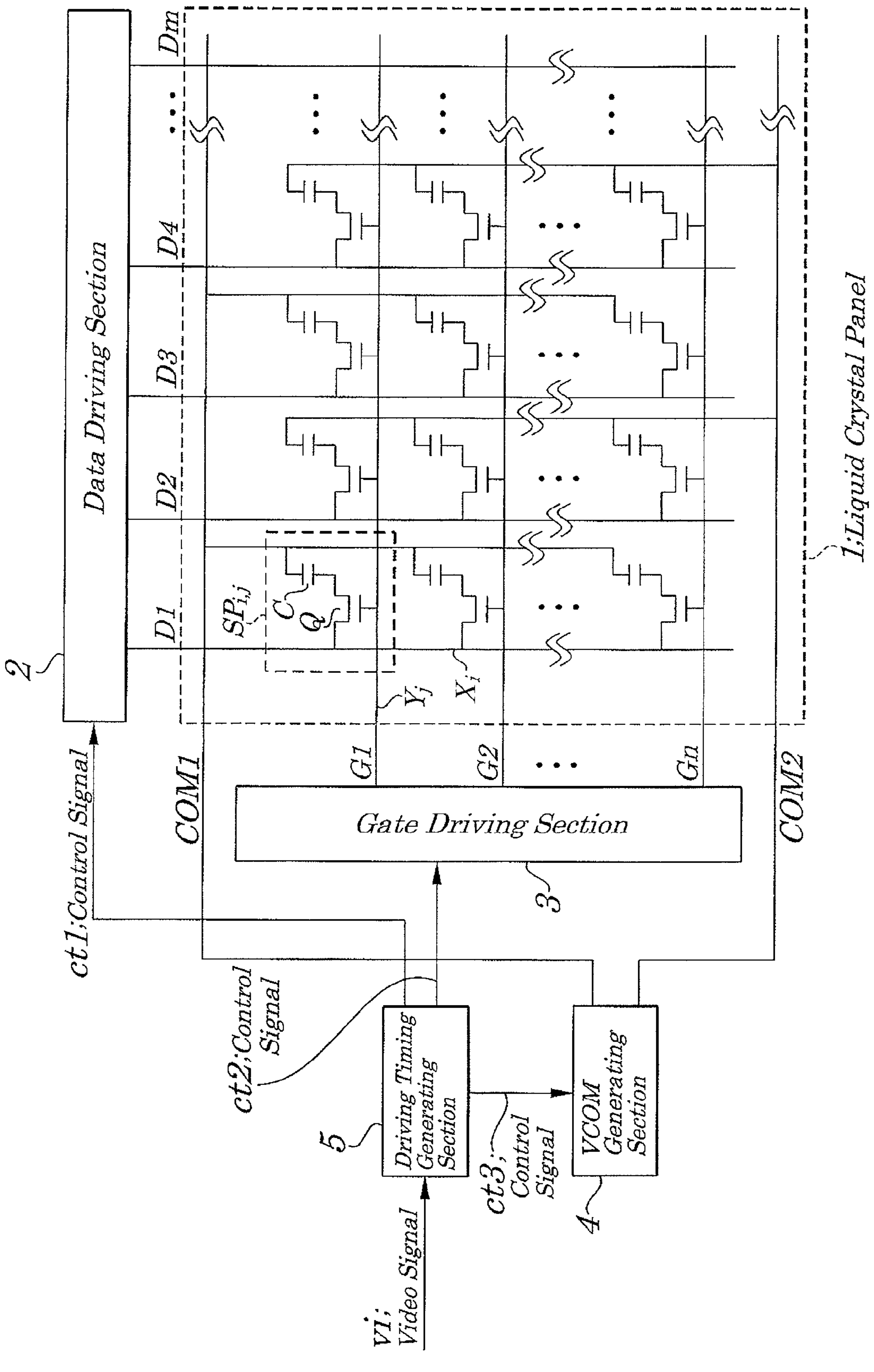
FIG.5 (RELATED ART)
FIG. 5 is a configuration diagram of a related art liquid crystal display device disclosed in Patent References 1 and 2.
Figure 6:
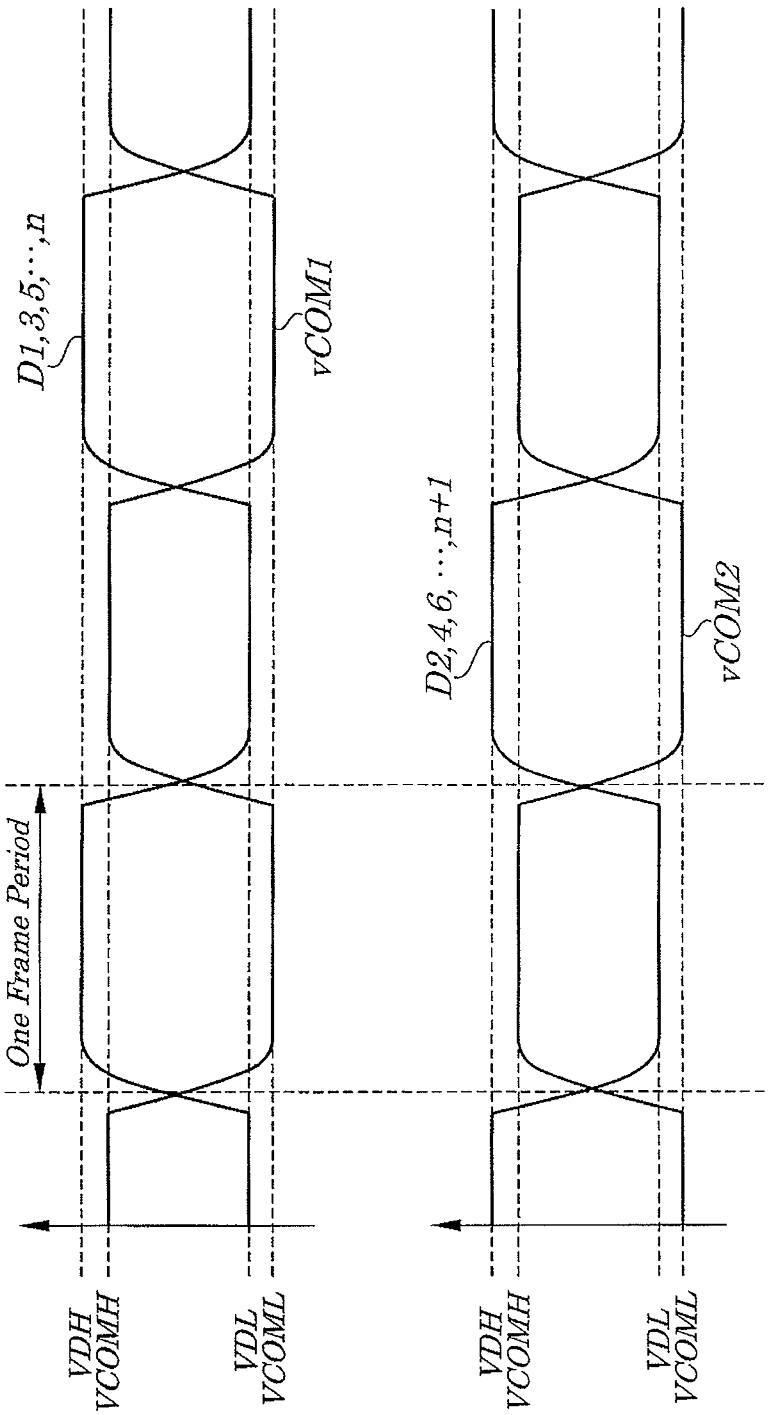
FIG.6 (RELATED ART)
FIG. 6 is a waveform diagram explaining operations of the related art liquid crystal display device of FIG. 5.
Figure 7:
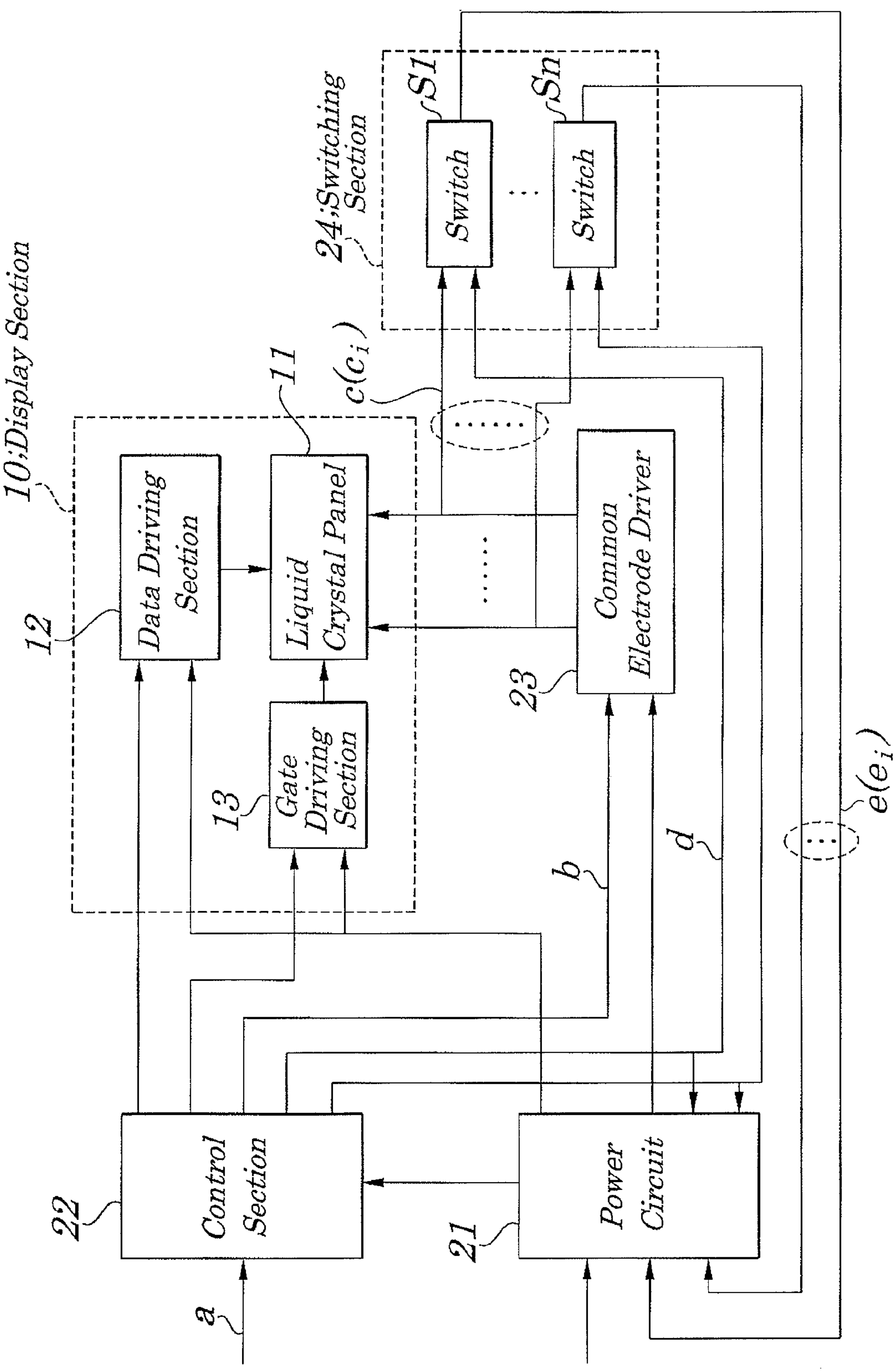
FIG. 7 (RELATED ART)
FIG. 7 is a configuration diagram of the related art liquid crystal display device disclosed in related art Patent Reference 3.
Figure 8:
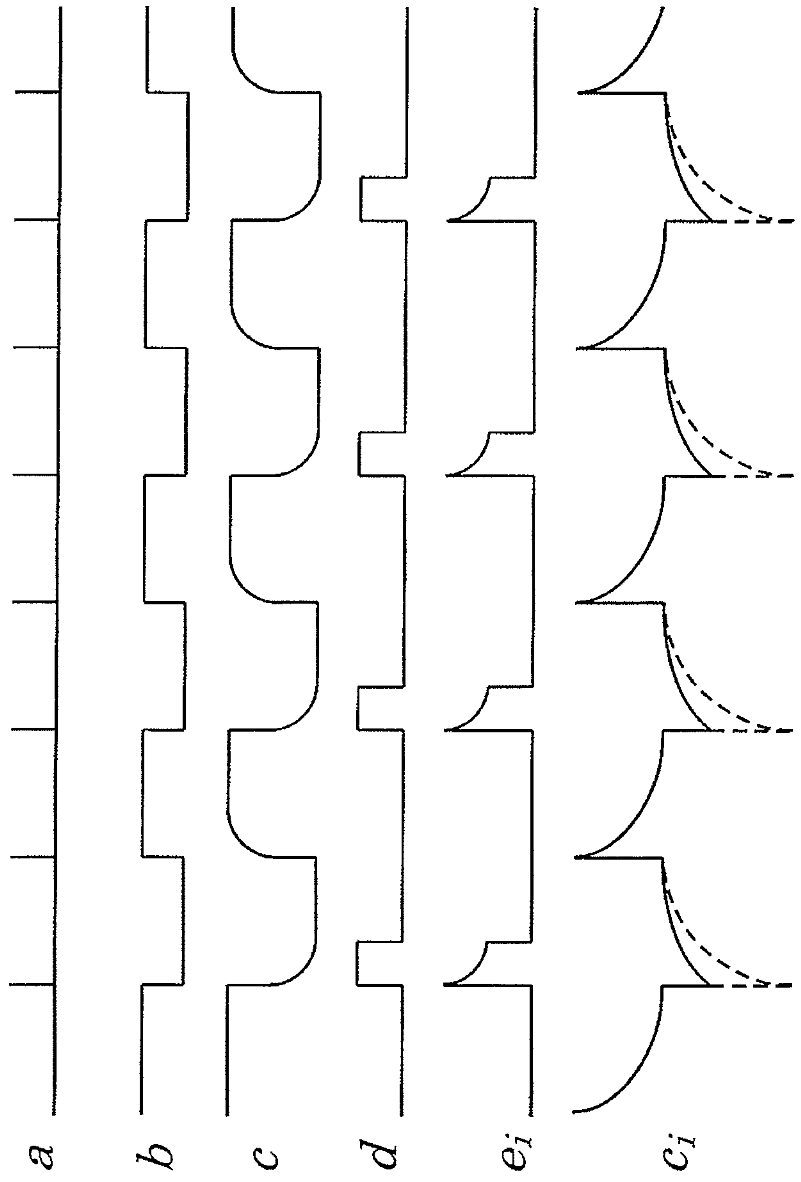
FIG. 8 (RELATED ART)
FIG. 8 is a waveform diagram explaining operations of the related art liquid crystal display device of FIG. 7.
Figure 9:
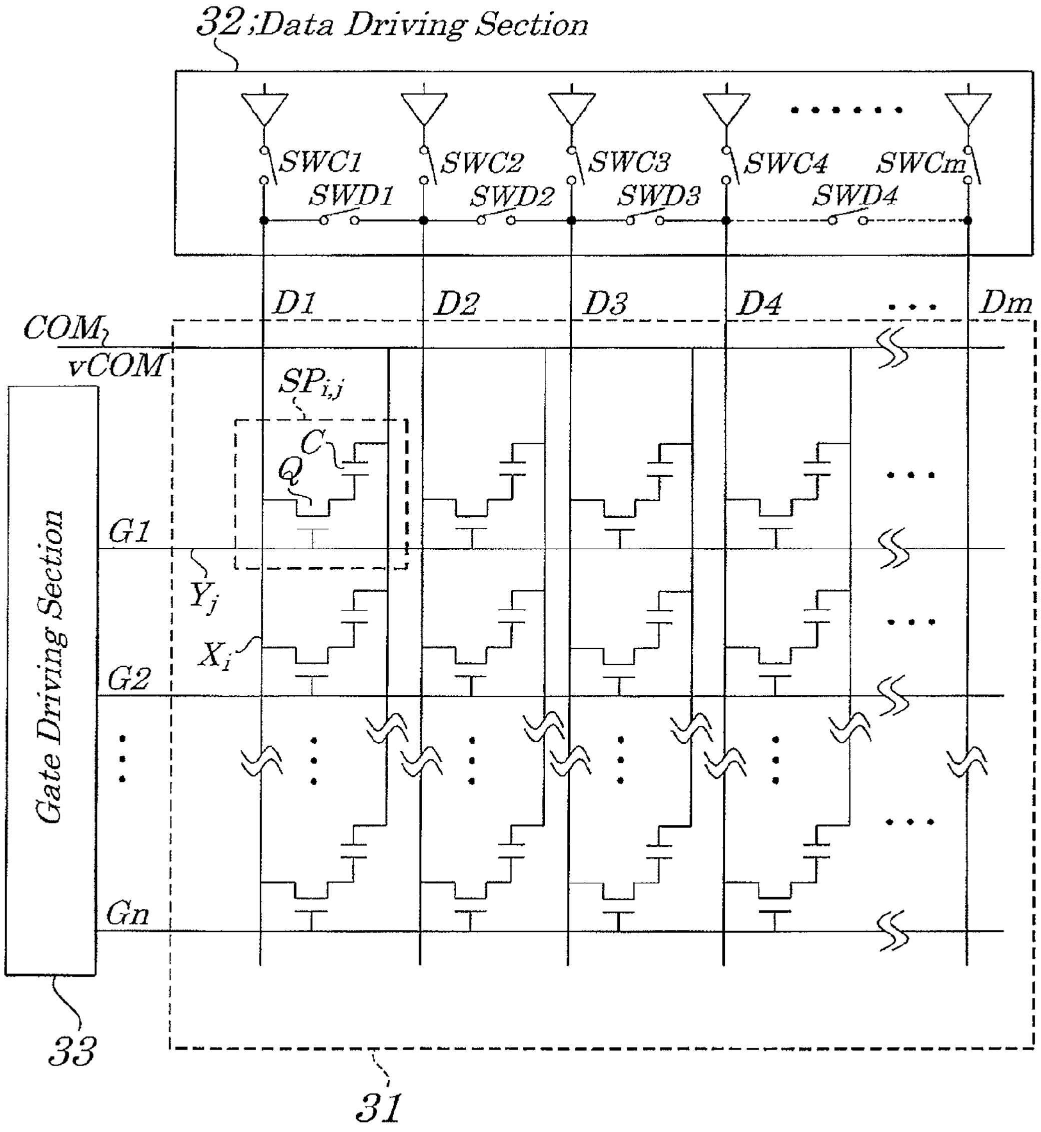
FIG.9 (RELATED ART)
FIG. 9 is a configuration diagram of the related art liquid crystal display device disclosed in Patent Reference 4.

FIG. 4 is a configuration diagram showing a modified example of a VCOM generating section and switching section and same reference numbers are assigned to parts having the same function as in FIG. 2. As shown in FIG. 4, the switches 61 and 62 are embedded in the VCOM generating section 44A. The switching section 46A includes the switch 63 which only has a function of causing a shorting of a circuit between the common electrodes COM1 and COM2. By these VCOM generating section 44A and switching section 46A, the same operations as the VCOM generating section 44 and switching section 46 in FIG. 2 are performed, thus providing the same advantages.

The present invention can be applied to all types of the liquid crystal display device having a first common electrode operating as a facing electrode of each of pixels mounted in a manner to correspond to odd-numbered columns of data electrodes and a second common electrode operating as a facing electrode of each of pixels mounted in a manner to correspond to even-numbered columns of data electrodes.

What is claimed is:

1. A liquid crystal display device comprising:

a liquid crystal panel having specified number of columns of data electrodes, specified number of rows of gate electrodes, pixels each mounted at an intersection of each of said data electrodes and each of said gate electrodes, a first common electrode operating as a facing electrode of each of said pixels mounted so as to correspond to odd-numbered columns of said data electrodes and a second common electrode operating as a facing electrode of each of said pixels mounted so as to correspond to even-numbered columns of said data electrodes;

a data driving section to write pixel data corresponding to each of said data electrodes in accordance with a video signal;

a gate driving section to drive each of said gate electrodes in a specified order in accordance with said video signal;

a common voltage generating section to generate a first common voltage whose polarity is inverted for every one horizontal period and to be applied to said first common electrode and to generate a second voltage having a polarity opposite to that of said first common voltage to be applied to said second common electrode in accordance with said video signal;

a control unit to exert control on said data driving section, said gate driving section, and said common voltage generating section in accordance with a video signal, and output, for a specified time, a charge equilibration control signal to establish a charge equilibration between said first common voltage and said second common voltage at a change point of polarities of said first common voltage and second common voltage; and a charge equilibration unit to establish a charge equilibration between said first common electrode and said second common electrode by causing a shorting of a circuit between said first common electrode and second common electrode in accordance with the input charge equilibration control signal, wherein said charge equilibration unit comprises:

a first switch to turn off a first common voltage to said first common electrode in accordance with the input charge equilibration control signal;

a second switch to turn off a second common voltage to said second common electrode in accordance with the input charge equilibration control signal; and a third switch to turn on the connection between said first common electrode and said second common electrode in accordance with the input charge equilibration control signal.

2. The liquid crystal display device according to claim 1, wherein said switching section comprises one integrated circuit chip.

3. The liquid crystal display device according to claim 1, wherein at least one of said data driving section, said gate driving section, said common voltage generating section, said control unit and said switching section comprises a one integrated circuit chip.

4. A driving method to be used in a liquid crystal display device having a liquid crystal panel having specified number of columns of data electrodes, specified number of rows of gate electrodes, pixels each mounted at an intersection of each of said data electrodes and each of said gate electrodes, a first common electrode operating as a facing electrode of each of said pixels mounted so as to correspond to odd-numbered columns of said data electrodes and a second common electrode operating as a facing electrode of each of said pixels mounted so as to correspond to even-numbered columns of said data electrodes, a data driving section to write pixel data corresponding to each of said data electrodes in accordance with a video signal, a gate driving section to drive each of said gate electrodes in a specified order in accordance with said video signal, a common voltage generating section to generate a first common voltage whose polarity is inverted for everyone horizontal period and to be applied to said first common electrode and to generate a second voltage having a polarity opposite to polarity of said first common voltage to be applied to said second common electrode in accordance with said video signal, a control unit to exert control on said data driving section, gate driving section, and said common voltage generating section in accordance with said video signal, and output, for a specified time, a charge equilibration control signal to establish a charge equilibration between said first common voltage and said second common voltage at a change point of polarities of said first common voltage and second common voltage, and a charge equilibration unit to establish a charge equilibration between said first common electrode and said second common electrode by causing a shorting of a circuit between said first common electrode and second common electrode in accordance with the input charge equilibration control signal, wherein said charge equilibration unit comprises a first switch, a second switch, and a third switch, and wherein said first switch turns off a first common voltage to said first common electrode in accordance with the input charge equilibration control signal, said second switch turns off a second common voltage to said second common electrode in accordance with the input charge equilibration control signal and said third switch turns on the connection between said first common electrode and said second common electrode in accordance with the input charge equilibration control signal.

5. A liquid crystal display device comprising:

a liquid crystal panel having specified number of columns of data electrodes, specified number of rows of gate electrodes, pixels each mounted at an intersection of each of said data electrodes and each of said gate electrodes, a first common electrode operating as a facing electrode of each of said pixels mounted so as to correspond to odd-numbered columns of said data electrodes and a second common electrode operating as a facing electrode of each of said pixels mounted so as to correspond to even-numbered columns of said data electrodes;

a data driving means to write pixel data corresponding to each of said data electrodes in accordance with a video signal;

a gate driving means to drive each of said gate electrodes in a specified order in accordance with said video signal;

a common voltage generating means to generate a first common voltage whose polarity is inverted for everyone horizontal period and to be applied to said first common electrode and to generate a second voltage having a polarity opposite to that of said first common voltage to be applied to said second common electrode in accordance with said video signal;

a control means to exert control on said data driving means, said gate driving means, and said common voltage generating means in accordance with a video signal, and output, for a specified time, a charge equilibration control signal to establish a charge equilibration between said first common voltage and said second common voltage at a change point of polarities of said first common voltage and second common voltage; and a charge equilibration means to establish a charge equilibration between said first common electrode and said second common electrode by causing a shorting of a circuit between said first common electrode and second common electrode in accordance with the input charge equilibration control signal, wherein said charge equilibration means comprises:

a first switch to turn off a first common voltage to said first common electrode in accordance with the input charge equilibration control signal;

a second switch to turn off a second common voltage to said second common electrode in accordance with the input charge equilibration control signal; and a third switch to turn on the connection between said first common electrode and said second common electrode in accordance with the input charge equilibration control signal.

* * * * *